United States Patent [19]

Lauk

[11] Patent Number: 5,639,864
[45] Date of Patent: Jun. 17, 1997

[54] AZO DYES, CONTAINING A TRIAZINE MIDDLE COMPONENT AND A MONOAZO AND A DISAZO DYE RADICAL

[75] Inventor: Urs Lauk, Zürich, Switzerland

[73] Assignee: Ciba-Geigy Corporation, Tarrytown, N.Y.

[21] Appl. No.: 460,396

[22] Filed: Jun. 2, 1995

[30] Foreign Application Priority Data

Jun. 20, 1994 [CH] Switzerland .............. 1951/94

[51] Int. Cl.$^6$ .......................... C09B 31/28; C09B 33/22;
C09B 35/36; C09B 35/38; C09B 62/09;
D06P 1/18
[52] U.S. Cl. .................. 534/796; 534/637; 8/532;
8/549; 8/639; 8/922
[58] Field of Search ................. 534/637, 796;
8/639, 549, 532, 922

[56] References Cited

U.S. PATENT DOCUMENTS

| | | | |
|---|---|---|---|
| 2,268,919 | 1/1942 | Anderau | 534/664 |
| 2,396,659 | 3/1946 | Kaiser et al. | 534/664 |
| 4,997,919 | 3/1991 | Schaulin et al. | 534/637 |
| 5,328,995 | 7/1994 | Schaulin et al. | 534/797 |

FOREIGN PATENT DOCUMENTS

| | | |
|---|---|---|
| 0176195 | 4/1986 | European Pat. Off. . |
| 179549 | 4/1986 | European Pat. Off. . |
| A/04/120180 | 4/1992 | Japan . |
| A311208 | 11/1955 | Switzerland . |
| 2019873 | 11/1979 | United Kingdom . |

OTHER PUBLICATIONS

Takimoto et al, Chemical Abstracts, 115:210427 (1991).
Patent Abstracts of Japan, vol. 16, No. 375 (C–973) [5418] (1992).
Tokyo–to Kankyo Kagaku Kenyusho Nenpo (1993), pp. 191–195.
Miki et al, Chemical Abstracts, 122(6) 63226m (1995).

*Primary Examiner*—Fiona T. Powers
*Attorney, Agent, or Firm*—Kevin T. Mansfield

[57] ABSTRACT

Azo dyes of formula

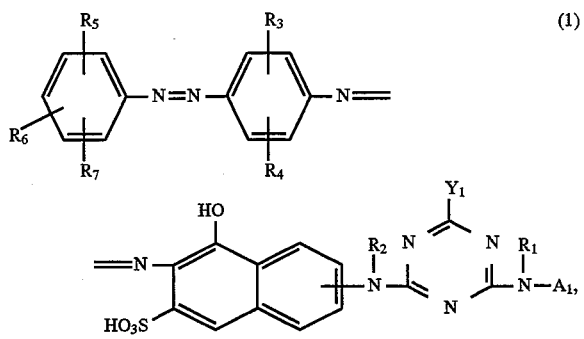

(1)

wherein $R_1$ and $R_2$ are each independently of the other hydrogen or unsubstituted or substituted $C_1$–$C_4$alkyl, $R_3$, $R_4$, $R_5$, $R_6$ and $R_7$ are each independently of one another hydrogen, halogen, sulfo, carbamoyl, carboxy, unsubstituted or hydroxy-substituted $C_1$–$C_4$alkyl or $C_1$–$C_4$alkoxy;

$C_2$–$C_4$alkanoylamino which is unsubstituted or substituted in the alkyl moiety by hydroxy or $C_1$–$C_4$alkoxy, or ureido which is unsubstituted or substituted in the amino end group by one or two $C_1$–$C_4$alkyl groups, $Y_1$ is hydroxy, halogen, $C_1$–$C_4$alkoxy, $C_1$–$C_4$alkylthio, amino; N-mono-$C_1$–$C_4$alkylamino or N,N-di-$C_1$–$C_4$alkylamino, each of which is unsubstituted or substituted in the alkyl moiety by hydroxy, sulfo, carboxy or $C_1$–$C_4$alkoxy; $C_5$–$C_7$cycloalkylamino which is unsubstituted or substituted in the cycloalkyl ring by $C_1$–$C_4$alkyl; phenylamino or N-$C_1$–$C_4$alkyl-N-phenylamino, each of which is unsubstituted or substituted in the phenyl ring by $C_1$–$C_4$alkyl, $C_1$–$C_4$alkoxy, carboxy, sulfo or halogen; morpholino or piperidin-1-yl, and $A_1$ is the radical of a metal-free monoazo dye, are direct dyes for different substrates, in particular cellulosic fibre materials. Said dyes are high-temperature resistant and are therefore particularly suitable for the one-bath, single-step dyeing of polyester/cotton blends with a disperse dye for polyester fibres under the dyeing conditions for polyester fibres.

10 Claims, No Drawings

AZO DYES, CONTAINING A TRIAZINE MIDDLE COMPONENT AND A MONOAZO AND A DISAZO DYE RADICAL

The present invention relates to novel azo dyes, to a process for the preparation thereof and to the use thereof for dyeing and printing fibre materials, in particular textile fibre materials.

It is the object of the invention to provide dyes which are suitable for dyeing nitrogen-containing and hydroxyl group-containing fibre materials, in particular cellulosic fibre materials, and which have good fastness properties and are high-temperature resistant.

It has now been found that the following azo dyes of formula (1) meet these requirements.

Accordingly, the invention relates to azo dyes of formula

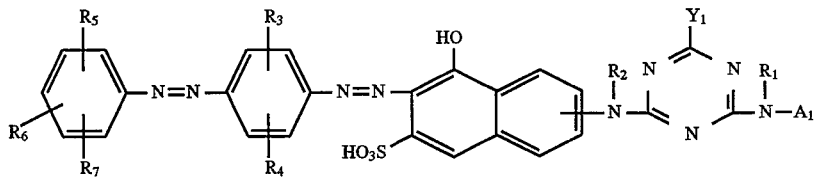

wherein
$R_1$ and $R_2$ are each independently of the other hydrogen or unsubstituted or substituted $C_1$–$C_4$alkyl, $R_3$, $R_4$, $R_5$, $R_6$ and $R_7$ are each independently of one another hydrogen, halogen, sulfo, carbamoyl, carboxy, unsubstituted or hydroxy-substituted $C_1$–$C_4$alkyl or $C_1$–$C_4$alkoxy;

$C_2$–$C_4$alkanoylamino which is unsubstituted or substituted in the alkyl moiety by hydroxy or $C_1$–$C_4$alkoxy, or ureido which is unsubstituted or substituted in the amino end group by one or two $C_1$–$C_4$alkyl groups, $Y_1$ is hydroxy, halogen, $C_1$–$C_4$alkoxy, $C_1$–$C_4$alkylthio, amino; N-mono-$C_1$–$C_4$alkylamino or N,N-di-$C_1$–$C_4$alkylamino, each of which is unsubstituted or substituted in the alkyl moiety by hydroxy, sulfo, carboxy or $C_1$–$C_4$alkoxy; $C_5$–$C_7$cycloalkylamino which is unsubstituted or substituted in the cycloalkyl ring by $C_1$–$C_4$alkyl; phenylamino or N-$C_1$–$C_4$alkyl-N-phenylamino, each of which is unsubstituted or substituted in the phenyl ring by $C_1$–$C_4$alkyl, $C_1$–$C_4$alkoxy, carboxy, sulfo or halogen; morpholino or piperidin-1-yl, and $A_1$ is the radical of a metal-free monoazo dye.

$R_1$, $R_2$, $R_3$, $R_4$, $R_5$, $R_6$ and $R_7$ defined as $C_1$–$C_4$-alkyl may suitably be methyl, ethyl propyl, isopropyl, butyl, sec-butyl, tert-butyl or isobutyl, in particular methyl or ethyl and, preferably, methyl. Possible substituents of $R_1$ and $R_2$ in the significance of $C_1$–$C_4$alkyl may be hydroxy, $C_1$–$C_4$alkoxy, halogen or sulfato. $R_3$, $R_4$, $R_5$, $R_6$ and $R_7$ defined as $C_1$–$C_4$alkyl may be further substituted by hydroxy.

The term sulfo broadly comprises the free acid form (—$SO_3H$) as well as the salt form. Alkali metal salts (Li, Na, K) or ammonium salts a particularly suitable.

$Y_1$, $R_3$, $R_4$, $R_5$, $R_6$ and $R_7$ defined as $C_1$–$C_4$alkoxy are suitably methoxy, ethoxy, propoxy, isopropoxy, butoxy or isobutoxy, preferably methoxy. $R_3$, $R_4$, $R_5$, $R_6$ and $R_7$ defined as $C_1$–$C_4$alkoxy may be further substituted by hydroxy.

$Y_1$, $R_3$, $R_4$, $R_5$, $R_6$ and $R_7$ defined as halogen are typically fluoro or chloro. Chloro is preferred.

$R_3$, $R_4$, $R_5$, $R_6$ and $R_7$ defined as $C_2$–$C_4$alkanyolamino may suitably be the unsubstituted radicals as well as those that are substituted in the alkyl moiety by hydroxy or $C_1$–$C_4$alkoxy. The unsubstituted radicals are preferred, typically acetylamino or propionylamino. Typical examples of substituted radicals are —NH—CO—$CH_2$—OH and —NH—CO—$CH_2$—$OCH_3$.

$R_3$, $R_4$, $R_5$, $R_6$ and $R_7$ defined as ureido which is unsubstituted or substituted in the amino end group by one or two $C_1$–$C_4$alkyl groups are suitably —NH—CO—$NH_2$, —NH—CO—NH—$CH_3$ and —NH—CO—N($CH_3$)$_2$.

$Y_1$ defined as N-mono-$C_1$–$C_4$alkylamino or N,N-di-$C_1$–$C_4$alkylamino may suitably comprise the unsubstituted radicals as well as those that are substituted in the alkyl moiety by hydroxy, sulfo, carboxy or $C_1$–$C_4$alkoxy. The radicals which are unsubstituted in the alkyl moiety and, in particular, those that are substituted in the alkyl moiety by hydroxy, are preferred. Typical examples are N-β-hydroxyethylamino and N,N-di-β-hydroxethylamino.

$Y_1$ defined as $C_5$–$C_7$cycloalkylamino may comprise the unsubstituted radicals as well as those that are substituted in the cycloalkyl ring by $C_1$–$C_4$alkyl, e.g. methyl or ethyl, preferably methyl. Preferred radicals of this kind are the corresponding cyclohexyl radicals.

$Y_1$ defined as phenylamino or N—$C_1$–$C_4$alkyl-N-phenylamino is preferably phenylamino. These radicals are preferably unsubstituted in the phenyl ring.

Radicals $A_1$ of a metal-free monoazo dye are preferably those of formula

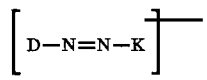

wherein D is the radical of a diazo component of the benzene or naphthalene series, and K is the radical of a coupling component of the benzene or naphthalene series.

Suitable substituents of the radicals D and K are the customary substituents for azo dyes. Typical examples are: sulfo; carboxy; hydroxy; carbamoyl; cyano; amino; halogen, such as fluoro or, preferably, chloro; ureido which is unsubstituted or substituted in the amino end group by one or two $C_1$–$C_4$alkyl groups; $C_1$–$C_4$alkyl or $C_1$–$C_4$alkoxy, each of which is unsubstituted or substituted by hydroxy; $C_2$–$C_6$alkanoylamino which is unsubstituted or substituted in the alkyl moiety by hydroxy or $C_1$–$C_4$alkoxy; as well as phenylamino or benzoylamino, each of which is unsubstituted or substituted in the phenyl ring by $C_1$–$C_4$alkyl, $C_1$–$C_4$alkoxy, $C_2$–$C_4$alkanoylamino, sulfo, carboxy, halogen, cyano or ureido.

$R_1$ and $R_2$ are preferably hydrogen or $C_1$–$C_4$alkyl. Hydrogen is particularly preferred.

$R_3$ and $R_4$ are preferably each independently of the other hydrogen, $C_1$–$C_4$alkyl; $C_1$–$C_4$alkoxy, $C_2$–$C_4$alkanoylamino or sulfo, each of which is unsubstituted or substituted by hydroxy; more particularly hydrogen, $C_1$–$C_4$alkyl, $C_1$–$C_4$alkoxy, $C_2$–$C_4$alkanoylamino or sulfo. One of $R_3$ and $R_4$ is preferably hydrogen.

$R_5$, $R_6$ and $R_7$ are preferably hydrogen, $C_1$–$C_4$alkyl, $C_1$–$C_4$alkoxy, sulfo or carbamoyl. $R_5$ is preferably sulfo or carbamoyl, more particularly sulfo.

$R_5$ is particularly preferably sulfo or carbamoyl, more particularly sulfo, and $R_6$ and $R_7$ are each independently of the other hydrogen, $C_1$–$C_4$alkyl or $C_1$–$C_4$alkoxy.

Y1 is preferably amino; N-mono-$C_1$–$C_4$alkylamino or N,N-di-$C_1C_4$alkylamino, each of which is unsubstituted or substituted in the alkyl moiety by hydroxy, sulfo, carboxy or $C_1$–$C_4$alkoxy; $C_5$–$C_7$cycloalkylamino which is unsubstituted or substituted in the cycloalkyl ring by $C_1$–$C_4$alkyl; phenylamino or N-$C_1$–$C_4$alkyl-N-phenylamino, each of which is unsubstituted or substituted in the phenyl ring by $C_1$–$C_4$alkyl, $C_1$–$C_4$alkoxy, carboxy, sulfo or halogen; morpholino or piperidin-1-yl.

$Y_1$ is particularly preferably amino; N-mono-$C_1$–$C_4$alkylamino or N,N-di-$C_1$–$C_4$alkylamino, each of which is unsubstituted or substituted in the alkyl moiety by hydroxy; cyclohexylamino, phenylamino, morpholino or piperidin-1-yl.

$Y_1$ defined as N-mono-$C_1$–$C_4$alkylamino or N,N-di-$C_1$–$C_4$alkylamino, each of which is substituted in the alkyl moiety by hydroxy, or morpholino, is very particularly preferred.

Preferred azo dyes are those, wherein $R_1$ and $R_2$ are hydrogen, $R_3$ and $R_4$ are each independently of the other hydrogen, $C_1$–$C_4$alkyl, $C_1$–$C_4$alkoxy, $C_2$–$C_4$alkanoylamino or sulfo, $R_5$ is sulfo or carbamoyl, preferably sulfo, and $R_6$ and $R_7$ are each independently of the other hydrogen, $C_1$–$C_4$alkyl or $C_1$–$C_4$alkoxy, and $Y_1$ is amino; N-mono-$C_1$–$C_4$alkylamino or N,N-di-$C_1$–$C_4$alkylamino, each of which is unsubstituted or substituted in the alkyl moiety by hydroxy; cyclohexylamino, phenylamino, morpholino or piperidin-1-yl.

Particularly preferred azo dyes are those, wherein $R_1$ and $R_2$ are hydrogen, $R_3$ and $R_4$ are each independently of the other hydrogen, sulfo or $C_2$–$C_4$alkanoylamino, $R_5$ is sulfo, and $R_6$ and $R_7$ are hydrogen, and $Y_1$ is N-mono-$C_1$–$C_4$alkylamino or N,N-di-$C_1$–$C_4$alkylamino, each of which is substituted in the alkyl moiety by hydroxy; or is morpholino.

Radical $A_1$ is preferably a radical of formula

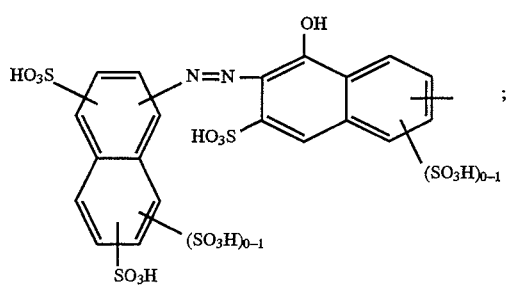

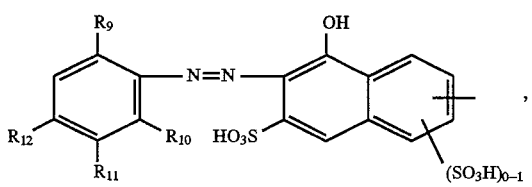

wherein $R_9$, $R_{10}$, $R_{11}$ and $R_{12}$ are each independently of one another hydrogen, sulfo, carboxy, halogen, cyano, ureido; $C_1$–$C_4$alkyl or $C_1$–$C_4$alkoxy, each of which is unsubstituted or substituted by hydroxy; or $C_2$–$C_4$alkanoylamino which is unsubstituted or substituted in the alkyl moiety by hydroxy or $C_1$–$C_4$alkoxy;

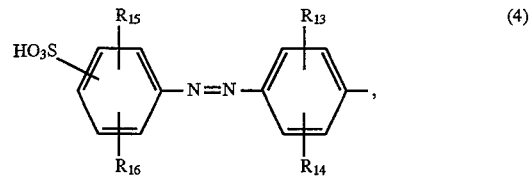

wherein $R_{13}$, $R_{14}$, $R_{15}$ and $R_{16}$ have the meanings given above for $R_9$, $R_{10}$, $R_{11}$ and $R_{12}$;

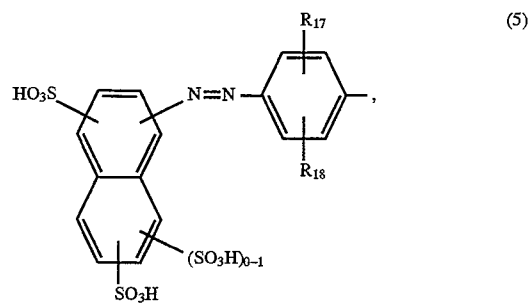

wherein $R_{17}$ and $R_{18}$ have the meanings given above for $R_9$, $R_{10}$, $R_{11}$ and $R_{12}$;

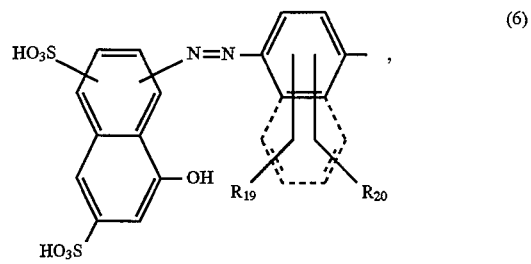

wherein $R_{19}$ and $R_{20}$ have the meanings given above for $R_9$, $R_{10}$, $R_{11}$ and $R_{12}$; or

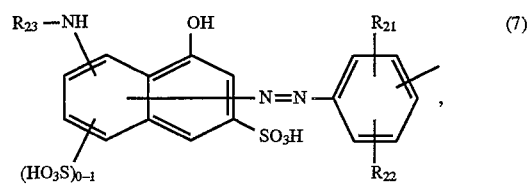

wherein $R_{21}$ and $R_{22}$ have the meanings given above for $R_9$, $R_{10}$, $R_{11}$ and $R_{12}$, and $R_{23}$ is hydrogen; $C_2$–$C_6$alkanoyl which is unsubstituted or substituted by hydroxy or $C_1$–$C_4$alkoxy; phenyl or benzoyl, each of which is unsubstituted or substituted in the phenyl ring by $C_1$–$C_4$alkyl, $C_1$–$C_4$alkoxy, $C_2$–$C_4$alkanoylamino, sulfo, carboxy, halogen, cyano or ureido.

Particularly preferred radicals $A_1$ are those of formula (3), (6) or (7).

The radicals $A_1$ indicated in the Examples are of particular importance.

Very particularly preferred azo dyes are those of formula

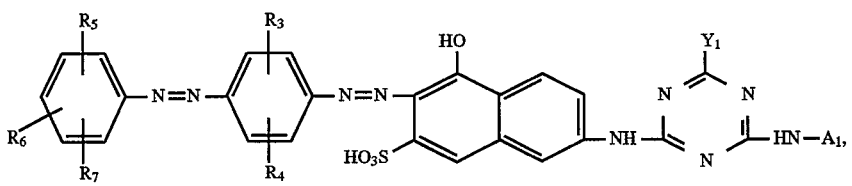

wherein $R_3$, $R_4$, $R_5$, $R_6$, $R_7$, $Y_1$ and $A_1$ have the meanings and preferred meanings indicated above. $R_3$ and $R_4$ are each independently of the other preferably hydrogen, sulfo or $C_2-C_4$alkanoylamino, $R_5$ is sulfo, $R_6$ and $R_7$ are hydrogen, $Y_1$ is N-mono-$C_1-C_4$alkylamino or N,N-di-$C_1C_4$alkylamino, each of which is substituted in the alkyl moiety by hydroxy; or is morpholino, and $A_1$ is a radical of formula (3), (6) or (7).

The invention further relates to a process for the preparation of the azo dyes of formula (1), which comprises reacting a compound of formula

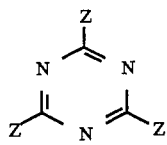 (9)

in succession, and in any order, with a compound of formula

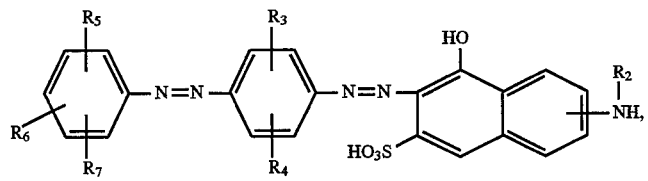

a compound of formula

 (11), and a compound of formula

 (12), in which formulae above $R_1$, $R_2$, $R_3$, $R_4$, $R_5$, $R_6$, $R_7$, $Y_1$ and $A_1$ are each as defined in connection with formula (1), and Z is halogen, preferably chloro.

It is preferred to react the trihalotriazine compound of formula (9) initially with about stoichiometric amounts of one of the compounds of formulae (10) and (11) in the temperature range from typically $-5°$ to $20°$ C., preferably from $0°$ to $5°$ C., while keeping the pH in the neutral to slightly acidic range, preferably from 3 to 7, more particularly from 3 to 5, by the addition of a suitable base, e.g. alkali metal bases such as lithium hydroxide, sodium hydroxide, potassium hydroxide, lithium carbonate, sodium carbonate or potassium carbonate. The reaction of the compound so obtained with the other compound of formula (10) or (11) is carried out, for example, also in about stoichiometric proportions, preferably in the temperature range from $0°$ to $60°$ C., more particularly from $20°$ to $60°$ C., and conveniently in the slightly acidic to slightly alkaline pH range of preferably 4 to 8, more particularly from 5 to 7. It is preferred to react first a compound of formula (10) with a compound of formula (9).

The triazinyl dyes obtainable by the above described processes will still contain a halogen atom Z, which can be converted into a group $Y_1$ by reaction with a compound of formula (12), at elevated temperature, preferably from $70°$ to $100°$ C., and in a neutral to slightly alkaline pH range of e.g. 7 to 12, preferably from 8 to 12.

$R_1$, $R_2$, $R_3$, $R_4$, $R_5$, $R_6$, $R_7$, $Y_1$ and $A_1$ of the compounds used in the above process have the meanings and preferred meanings given hereinabove.

The compounds of formulae (9), (10), (11) and (12) are known or can be obtained by methods analogous to those for obtaining known compounds.

The compounds of formulae (10) and (11) can be obtained in known manner by diazotising and coupling suitable starting compounds. Diazotisation is carded out in per se known manner, for example with a nitrite, typically with an alkali metal nitrite such as sodium nitrite, in a medium containing mineral acid, conveniently hydrochloric acid, in the temperature range from typically $-5°$ to $40°$ C., preferably from $-5°$ to $10°$ C. Coupling is carried out in per se known manner in the acid, neutral or weakly alkaline pH range and in the temperature range from typically $0°$ to $30°$ C.

The azo dyes of formula (1) are either in the form of their free acid or, preferably, in the form of the salts thereof.

Suitable salts are typically the akali metal salts, alkaline earth metal salts or ammonium salts, or the salts of an organic amine. Illustrative examples are the sodium, lithium, potassium or ammonium salts or the salt of mono-, di- or triethanolamine.

A further object of the invention is the use of the azo dyes of formula (1), for dyeing and printing nitrogen-containing and, preferably, hydroxyl group-containing fibre materials.

The novel azo dyes of formula (1) are thus suitable for dyeing and printing nitrogen-containing or, preferably, cellulosic, fibre materials, preferably textile fibre materials of silk, wool or synthetic polyamides, as well as preferably fibre material made from cellulosic fibres such as rayon, cotton or hemp.

With respect to their tinctorial properties, the novel azo dyes of formula (1) may be termed direct dyes (C.I. direct dyes).

It is also possible to dye textile fibre materials made from fibre blends, typically wool/cotton, polyamide/cotton, polyacrylic/cotton or, preferably, polyester/cotton fibre blends by one-bath dyeing processes and in the presence of dyes suitable for dyeing each of the other types of fibre.

The textile fibre materials may be in any form of presentation, conveniently as fibres, yarns, woven or knitted goods.

Besides the textile substrates, leather and paper can also be dyed with the novel azo dyes of formula (1).

Level dyeings in red shades of good allround fastness properties are obtained, especially good fastness to rubbing, wet treatments, wet rubbing, perspiration and light. If necessary, the wetfastness properties, in particular the washfastness, of the resultant direct dyeings and prints can be substantially enhanced by an aftertreatment with fixing agents.

The novel dyes of formula (1) can be readily combined with other dyes, especially disperse dyes. They have sufficient high-temperature stability and can thus be used for dyeing under dyeing conditions for polyester fibres, i.e. in the temperature range from c. 100° to 150° C., preferably from 110° to 130° C., from an aqueous liquor and in a pH range from 4 to 7.5, preferably from 5 to 7.

It is therefore possible to use standard disperse dyes together with the novel dyes of formula (1) in a single-step, one-bath process for dyeing polyester/cotton blends in which both fibre components are dyed uniformly in a fast shade by the respective dye. When using a disperse dye having the same shade as the inventive dye, it is also possible to obtain solid shade dyeings.

With the novel dyes of formula (1) it is possible to simplify substantially the dyeing of textile fibre blends, e.g. those of polyester and cellulosic fibres. The standard dyeing of each type of fibre of a blend in a separate step using different dyeing conditions is thus no longer necessary.

The following Examples will serve to illustrate the invention. Parts and percentages are by weight, unless otherwise indicated. The relationship between parts by weight and parts by volume is the same as that between the kilogram and the litre.

EXAMPLE 1 a) 9.23 parts of cyanuric chloride are stirred with 200 parts of ice/water and cooled to 0° to 5° C. A solution containing 800 parts of water and 30.5 parts of the compound of formula

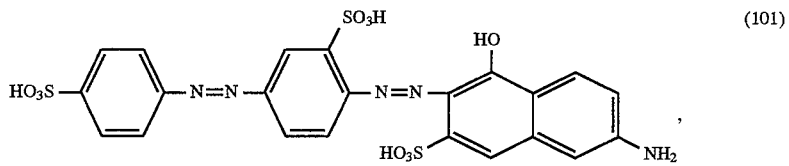

in the form of the free acid is then added dropwise to this suspension over c. 1.5 hours while keeping the pH at 3 by addition of a 2N solution of sodium hydrogen carbonate. The pH is then adjusted to 5 and the batch is allowed to react further for c. 3–4 hours at room temperature. A solution containing 300 parts of water and 22.7 parts of the compound of formula

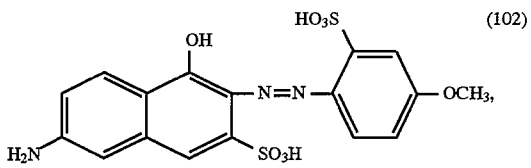

in the form of the free acid is then added dropwise to this solution at room temperature while keeping the pH at 5.7 by addition of a 2N solution of sodium hydrogen carbonate. The reaction mixture is then heated to 55° C. at pH 5.7, until no more sodium hydrogen carbonate is consumed, giving a solution which contains the compound of formula

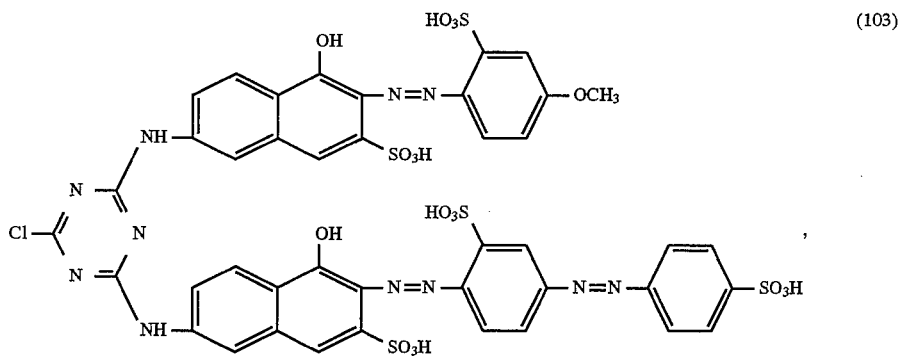

in the form of the free acid.

b) 2.85 parts of morpholine are added to the solution obtainable as indicated above. The solution is heated to 85° C., while keeping the pH at 8.5 by the addition of a 4N aqueous solution of sodium hydroxide. This third condensation takes about 3 hours. The product is salted out at 60° C. with 200 parts of sodium chloride to give, after filtration and drying, a dye which, in the form of the free acid, corresponds to the compound of formula

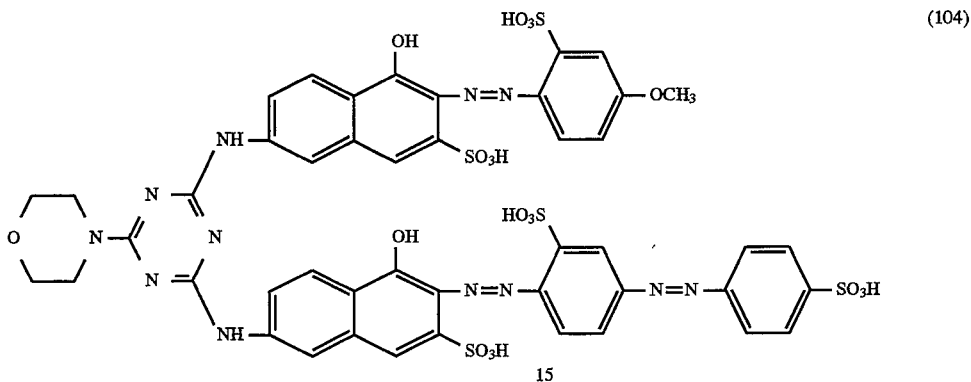

and which dyes cotton in a red shade.

EXAMPLE 2

Step a) of Example 1 is repeated, but using instead of 22.7 parts of the compound of formula (102) an equimolar amount of the compound of formula

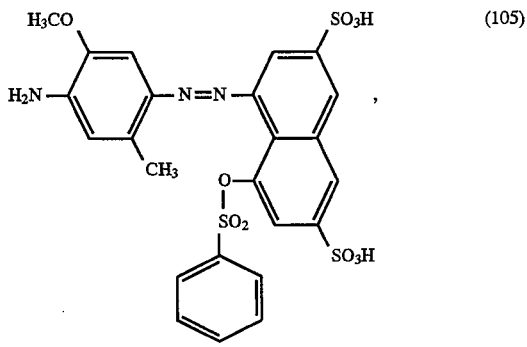

in the form of the free acid, to give a solution which contains the compound of formula in the form of the free acid.

b) 2.85 parts of morpholine are added to the solution obtainable as indicated above. The solution is heated to 85° C., while keeping the pH at 8.5 by the addition of a 4N aqueous solution of sodium hydroxide. This third condensation takes about 3 hours. To the batch are then added 42 parts of an aqueous solution of sodium hydroxide (30%) and the benzenesulfonic acid radical is eliminated over 40 minutes at 85° C. The product is then salted out at 60° C. with 200 parts of sodium chloride to give, after filtration and drying, a dye which, in the form of the free acid, corresponds to the compound of formula

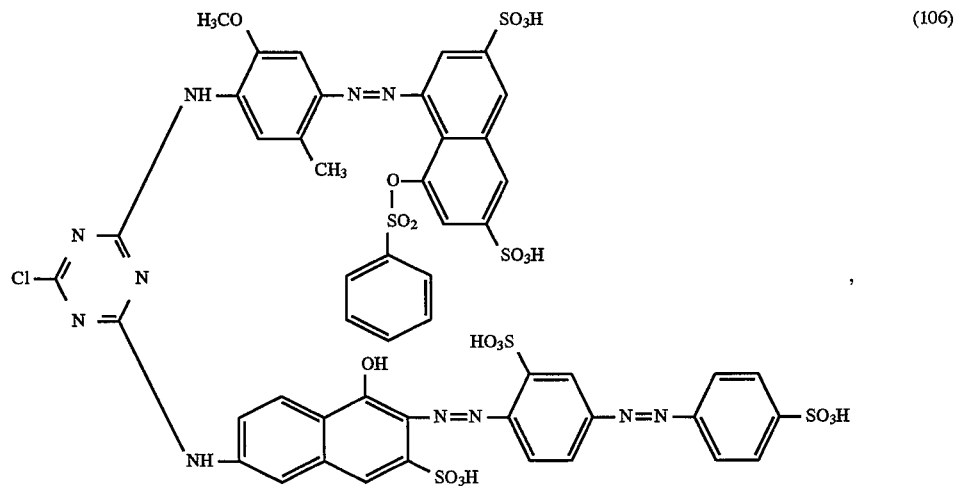

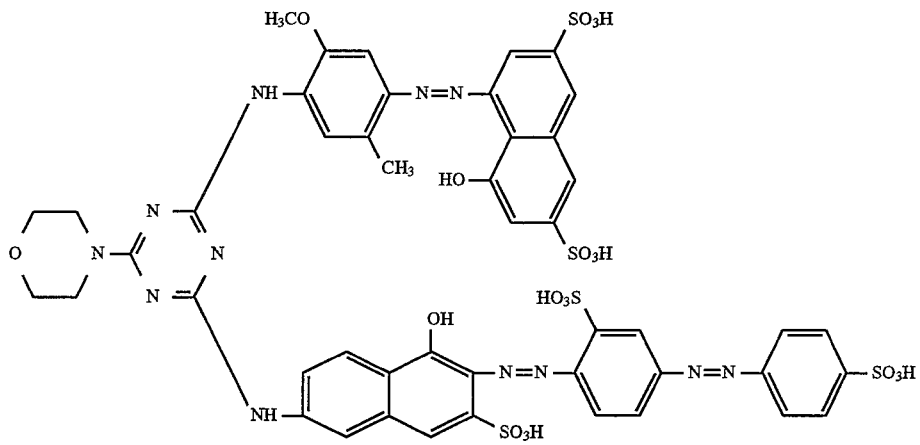

and which dyes cotton in a red shade.

EXAMPLES 3 TO 37

The dyes listed in Table 1 in the form of the free acid and having the general formula

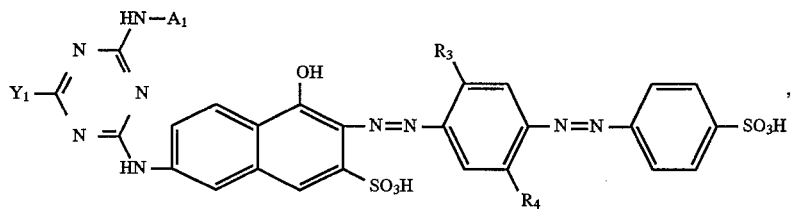

wherein $A_1$, $Y_1$, $R_3$ and $R_4$ have the meanings given in Table 1, may be obtained in general accordance with Examples 1 and 2. The dyes listed in Table 1 dye cotton in a red shade.

TABLE 1

| Ex. | $A_1$ | $Y_1$ | $R_3$ | $R_4$ |
|---|---|---|---|---|
| 3 | 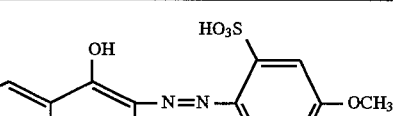 | —NHCH$_2$CH$_2$OH | —SO$_3$H | —H |
| 4 | 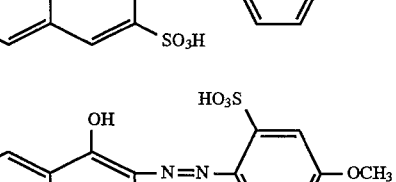 | —N(CH$_2$CH$_2$OH)$_2$ | —SO$_3$H | —H |
| 5 | 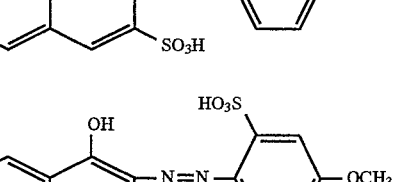 | morpholino | —SO$_3$H | —H |

TABLE 1-continued

| Ex. | A₁ | Y₁ | R₃ | R₄ |
|-----|-----|-----|-----|-----|
| 6 | 4-hydroxy-3-sulfonaphthyl azo-(2-sulfo-4-methoxy)phenyl | —NH—phenyl | —SO₃H | —H |
| 7 | 4-hydroxy-3-sulfonaphthyl azo-(2-sulfo-4-methoxy)phenyl | —NH—CH₂—CH(OH)—CH₂—OH | —SO₃H | —H |
| 8 | 4-hydroxy-3-sulfonaphthyl azo-(2-sulfo-4-methoxy)phenyl | —NHCH₂CH₃ | —SO₃H | —H |
| 9 | 4-hydroxy-3-sulfonaphthyl azo-(2-methoxy-5-sulfo)phenyl | —NHCH₂CH₂OH | —SO₃H | —H |
| 10 | 4-hydroxy-3-sulfonaphthyl azo-(2-methoxy-5-sulfo)phenyl | —N(CH₂CH₂OH)₂ | —SO₃H | —H |
| 11 | 4-hydroxy-3-sulfonaphthyl azo-(2-methoxy-5-sulfo)phenyl | —N(morpholino) | —SO₃H | —H |
| 12 | 4-hydroxy-3-sulfonaphthyl azo-(2-methoxy-5-sulfo)phenyl | —NH—phenyl | —SO₃H | —H |
| 13 | 4-hydroxy-3-sulfonaphthyl azo-(2-methoxy-5-sulfo)phenyl | —NH—CH₂—CH(OH)—CH₂—OH | —SO₃H | —H |
| 14 | 4-hydroxy-3-sulfonaphthyl azo-(2-methoxy-5-sulfo)phenyl | —NHCH₂CH₃ | —SO₃H | —H |

TABLE 1-continued

| Ex. | A₁ | Y₁ | R₃ | R₄ |
|---|---|---|---|---|
| 15 | H₃CO-(phenyl with CH₃)-N=N-(naphthyl with SO₃H, HO, SO₃H) | —NHCH₂CH₂OH | —SO₃H | —H |
| 16 | H₃CO-(phenyl with CH₃)-N=N-(naphthyl with SO₃H, HO, SO₃H) | —N(CH₂CH₂OH)₂ | —SO₃H | —H |
| 17 | (phenyl with SO₃H)-N=N-(naphthyl with H₂N, SO₃H, HO, SO₃H) | —NHCH₂CH₂OH | —SO₃H | |
| 18 | (phenyl with SO₃H)-N=N-(naphthyl with H₂N, SO₃H, HO, SO₃H) | —N(CH₂CH₂OH)₂ | —SO₃H | |
| 19 | (phenyl with SO₃H)-N=N-(naphthyl with H₂N, SO₃H, HO, SO₃H) | —N(morpholino) | —SO₃H | —H |

TABLE 1-continued

| Ex. | $A_1$ | $Y_1$ | $R_3$ | $R_4$ |
|---|---|---|---|---|
| 20 | (4-methyl-2-sulfophenyl)azo-substituted 3-amino-8-hydroxynaphthalene-2,6-disulfonic acid | —NHCH$_2$CH$_2$CH$_2$OH | —SO$_3$H | —H |
| 21 | (4-methyl-2-sulfophenyl)azo-substituted 3-amino-8-hydroxynaphthalene-2,6-disulfonic acid | —NH–phenyl | —SO$_3$H | —H |
| 22 | (5-methyl-2-sulfophenyl)azo-substituted 2-amino-8-hydroxynaphthalene-6-sulfonic acid | —NHCH$_2$CH$_2$OH | —SO$_3$H | —H |
| 23 | (5-methyl-2-sulfophenyl)azo-substituted 2-amino-8-hydroxynaphthalene-6-sulfonic acid | —N(morpholino) | —SO$_3$H | —H |
| 24 | (5-methyl-2-sulfophenyl)azo-substituted 2-amino-8-hydroxynaphthalene-6-sulfonic acid | —N(CH$_2$CH$_2$OH)$_2$ | —SO$_3$H | —H |

TABLE 1-continued

| Ex. | A₁ | Y₁ | R₃ | R₄ |
|---|---|---|---|---|
| 25 | (structure: tolyl-N=N-naphthalene with OH, SO₃H, HO₃S, and NH-C(=O)-phenyl substituents) | —NHCH₂CH₂OH | —SO₃H | —H |
| 26 | (structure: tolyl-N=N-naphthalene with OH, SO₃H, HO₃S, and NH-C(=O)-phenyl substituents) | —N(morpholine) | —SO₃H | —H |
| 27 | (structure: tolyl-N=N-naphthalene with OH, SO₃H, HO₃S, and NH-C(=O)-phenyl substituents) | —N(CH₂CH₂OH)₂ | —SO₃H | —H |
| 28 | (structure: tolyl-N=N-naphthalene with OH, SO₃H, HO₃S, SO₃H and NH-C(=O)-phenyl substituents) | —N(morpholine) | —SO₃H | —H |
| 29 | (structure: tolyl-N=N-naphthalene with OH, SO₃H, HO₃S, SO₃H and NH-C(=O)-phenyl substituents) | —NHCH₂CH₂CH₂OH | —SO₃H | —H |

TABLE 1-continued

| Ex. | A₁ | Y₁ | R₃ | R₄ |
|---|---|---|---|---|
| 30 | (5-methylphenyl-2-SO₃H)–N=N–[naphthalene: 4-OH, 3-SO₃H (at position ortho to azo via HO₃S), 5-NHC(=O)Ph, 7-SO₃H] | —NH—C₆H₅ | —SO₃H | —H |
| 31 | [6-methyl-1-hydroxy-naphthalene-3-SO₃H]–N=N–[2-OCH₃, 5-SO₃H phenyl] | morpholino (—N(CH₂CH₂)₂O) | —H | —H |
| 32 | [5-OCH₃, 4-CH₃ (2-methyl) phenyl]–N=N–[naphthalene: 3-SO₃H, 7-SO₃H, 5-OH] | morpholino | —H | —H |
| 33 | [4-methylphenyl]–N=N–[naphthalene: 2-NH₂, 3-SO₃H, 5-OH (HO on ring), 7-SO₃H] | morpholino | —H | —H |
| 34 | [4-methyl-2-SO₃H phenyl]–N=N–[naphthalene: 8-NH₂... 4-OH, 6-SO₃H] | morpholino | —H | —H |
| 35 | [4-methyl-2-SO₃H phenyl]–N=N–[naphthalene: 8-NH₂, 5-OH (HO on ring), 7-SO₃H] | morpholino | —SO₃H | —NHCOCH₃ |

TABLE 1-continued

| Ex. | A₁ | Y₁ | R₃ | R₄ |
|---|---|---|---|---|
| 36 | (H₂N, SO₃H-substituted naphthalene with N=N-phenyl-SO₃H, HO, SO₃H) | —N(morpholino)O | —SO₃H | —NHCOCH₃ |
| 37 | (H₂N, SO₃H-substituted naphthalene with N=N-phenyl-SO₃H, HO, SO₃H) | —NHCH₂CH₂OH | —SO₃H | —H |

DYEING INSTRUCTIONS 1

10 parts of cotton fabric (bleached and mercerised) are put at about 30° C. into a dyebath which contains 200 parts of water and 0.35 part of the dye of Example 1. The liquor is heated over 30 minutes to 95° C. and kept for 15 minutes at that temperature. Then 4 parts of sodium sulfate are added and dyeing is continued for a further 45 minutes at 95° C. Afterwards the dyebath is cooled to 80° C. over 15 minutes and kept for another 15 minutes at that temperature. The dyeing is then thoroughly rinsed with cold water and dried.

DYEING INSTRUCTIONS 2

10 parts of a polyester/cotton fibre blend are put at c. 50° C. into a dyebath containing 200 parts of water, a dye mixture consisting of 0.2 part of C.I. Disperse Red 60, 0.2 part of the dye of Example 1, 0.4 part of ammonium sulfate and 0.2 part of an artionic dispersant (e.g. a condensate of formaldehyde and naphthalenesulfonic acid). The dyebath is adjusted to pH 5.5 with formic acid and, after addition of 1 part of sodium sulfate, heated over 45 minutes to c. 130° C. Dyeing is continued for another 45 minutes at 130° C. The dyebath is then cooled to about 80° C. over 30 minutes and kept for a further 45 minutes at that temperature. The dyeing is then thoroughly rinsed with cold water and dried.

DYEING INSTRUCTIONS 3

The procedure of Dyeing Instruction 1 or 2 is repeated, except that after termination of the dyeing procedure the cold-rinsed dyeing is put into a fresh warm bath of c. 30° C. which contains 200 parts of water and 0.2–0.6 part of a cationic aftertreatment agent (amine/formaldehyde/dicyandiamide condensate or formulation based on dicyandiamide and diethylenetriamine). The dyeing is aftertreated for 30 minutes at 30° C. and then dried without a further rinsing step. A dyeing having enhanced wetfastness properties is obtained.

DYEING INSTRUCTIONS 4

The procedure of Dyeing Instruction 1 or 2 is repeated, except that after termination of the dyeing procedure the cold-rinsed dyeing is put into a fresh warm bath of c. 25° C. which contains 200 parts of water, 1 part of sodium sulfate and 0.6 part of a fibre-reactive cationic aftertreatment agent based on N-methyldialkylamine and epichlorohydrin. The temperature is raised to 40° C. over 15 minutes, then 0.8 part of 30% sodium hydroxide solution is added, and the dyeing is treated for a further 45 minutes at 40° C. The dyeing is finally rinsed hot and dried. It has enhanced wetfastness properties.

What is claimed is:

1. An azo dye of the formula

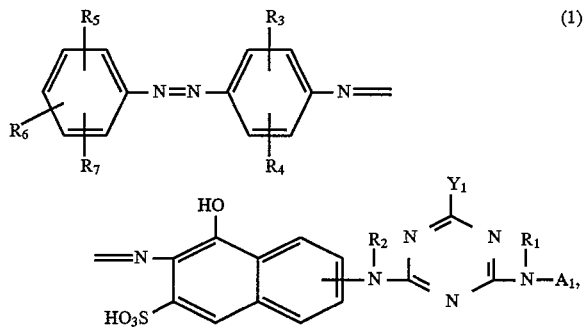

(1)

wherein

R₁ and R₂ are each independently of the other hydrogen or unsubstituted or substituted $C_1$–$C_4$alkyl, R₃ and R₄ are each independently of one another hydrogen, halogen, sulfo, carbamoyl, carboxy, $C_2$–$C_4$alkanoylamino which is unsubstituted or substituted in the alkyl moiety by hydroxy or $C_1$–$C_4$alkoxy, or ureido which is unsubstituted or substituted in the amino end group by one or two $C_1$–$C_4$alkyl groups, R₅, R₆ and R₇ are each independently of one another hydrogen, halogen, sulfo, carbamoyl, carboxy, unsubstituted or hydroxy-substituted $C_1$–$C_4$alkyl or $C_1$–$C_4$alkoxy; $C_2$–$C_4$alkanoylamino which is unsubstituted or substituted in the alkyl moiety by hydroxy or $C_1$–$C_4$alkoxy, or ureido which is unsubstituted or substituted in the amino end group by one or two $C_1$–$C_4$alkyl groups, $Y_1$ is N-mono-$C_1$–$C_4$alkylamino or N,N-di-$C_1$–$C_4$alkylamino, each of which is substituted in the alkyl moiety by hydroxy;

or is morpholino, and $A_1$ is is a radical of the formula

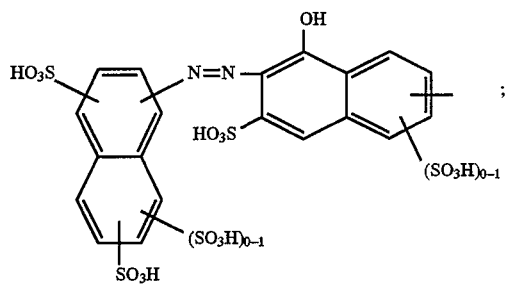 (2)

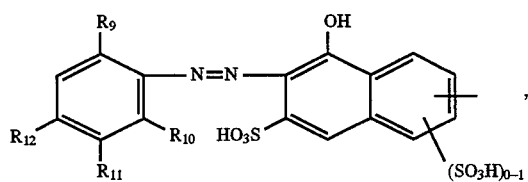 (3)

wherein $R_9$, $R_{10}$, $R_{11}$ and $R_{12}$ are each independently of one another hydrogen, sulfo, carboxy, halogen, cyano, ureido; $C_1$–$C_4$alkyl or $C_1$–$C_4$alkoxy, each of which is unsubstituted or substituted by hydroxy; or $C_2$–$C_4$alkanoylamino which is unsubstituted or substituted in the alkyl moiety by hydroxy or $C_1$–$C_4$alkoxy;

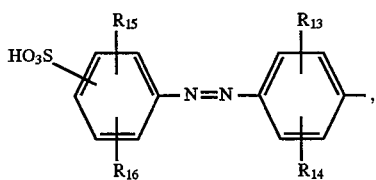 (4)

wherein $R_{13}$, $R_{14}$, $R_{15}$ and $R_{16}$ have the meanings given above for $R_9$, $R_{10}$, $R_{11}$ and $R_{12}$;

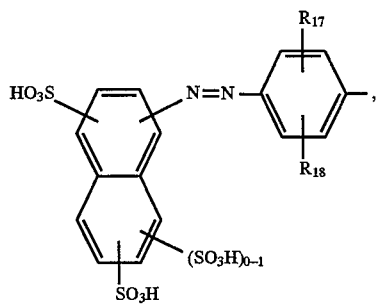 (5)

wherein $R_{17}$ and $R_{18}$ have the meanings given above for $R_9$, $R_{10}$, $R_{11}$ and $R_{12}$;

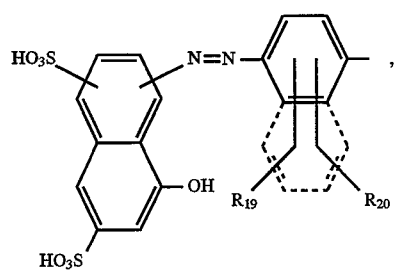 (6)

wherein $R_{19}$ and $R_{20}$ have the meanings given above for $R_9$, $R_{10}$, $R_{11}$ and $R_{12}$; or

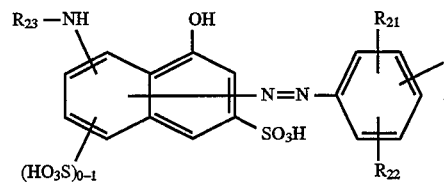 (7)

wherein $R_{21}$ and $R_{22}$ have the meanings given above for $R_9$, $R_{10}$, $R_{11}$ and $R_{12}$, and $R_{23}$ is hydrogen; $C_2$–$C_6$alkanoyl which is unsubstituted or substituted by hydroxy or $C_1$–$C_4$alkoxy; phenyl or benzoyl, each of which is unsubstituted or substituted in the phenyl ring by $C_1$–$C_4$alkyl, $C_1$–$C_4$alkoxy, $C_2$–$C_4$alkanoylamino, sulfo, carboxy, halogen, cyano or ureido.

2. An azo dye according to claim 1, wherein $R_1$ and $R_2$ are hydrogen or $C_1$–$C_4$alkyl.

3. An azo dye according to claim 1, wherein $R_3$ and $R_4$ are each independently of the other hydrogen, $C_2$–$C_4$alkanoylamino or sulfo.

4. An azo dye according to claim 1, wherein $R_5$ is sulfo or carbamoyl, and $R_6$ and $R_7$ are each independently of the other hydrogen, $C_1$–$C_4$alkyl or $C_1$–$C_4$alkoxy.

5. An azo dye according to claim 1, wherein $R_1$ and $R_1$ are hydrogen, $R_3$ and $R_4$ are each independently of the other hydrogen, $C_2$–$C_4$alkanoylamino or sulfo, $R_5$ is sulfo or carbamoyl, and $R_6$ and $R_7$ are each independently of the other hydrogen, $C_1$–$C_4$alkyl or $C_1C_4$alkoxy, and $Y_1$ is N-mono-$C_1$–$C_4$alkylamino or N,N-di-$C_1$–$C_4$alkylamino, each of which is substituted in the alkyl moiety by hydroxy; or is morpholino.

6. An azo dye according to claim 5, wherein $R_1$ and $R_2$ are hydrogen, $R_3$ and $R_4$ are each independently of the other hydrogen, sulfo or $C_2$–$C_4$alkanoylamino, $R_5$ is sulfo, and $R_6$ and $R_7$ are hydrogen, and $Y_1$ is N-mono-$C_1$–$C_4$alkylamino or N,N-di-$C_1$–$C_4$alkylamino, each of which is substituted in the alkyl moiety by hydroxy; or is morpholino.

7. An azo dye according to claim 1, of formula

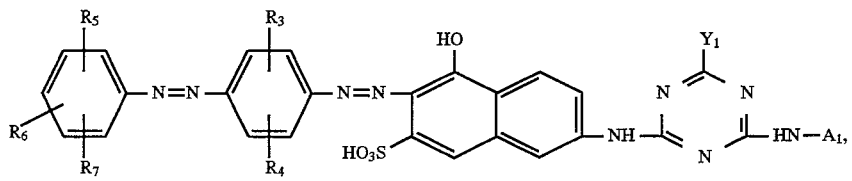

(8)

wherein

R₃ and R₄ are each independently of the other hydrogen, sulfo or $C_2$–$C_4$alkanoylamino, R₅ is sulfo, and R₆ and R₇ are hydrogen.

Y1 is N-mono-$C_1$–$C_4$alkylamino or N,N-di-$C_1$–$C_4$alkylamino, each of which is substituted in the alkyl moiety by hydroxy; or is morpholino, and A₁ is a radical of formula (3), (6) or (7).

8. A process for dyeing or printing nitrogen-containing or hydroxyl group-containing cellulosic fibre material, which process comprises applying to said fibre material a tinctorial amount of a dye according to claim 1.

9. A process according to claim 8, wherein a blend of synthetic fibres and cellulosic fibre material is dyed in the presence of a disperse dye for the synthetic fibres under the dyeing conditions for the synthetic fibres.

10. A process for dyeing a polyester/cotton blend with a disperse and a direct dye, which comprises using, besides the disperse dye, a dye of formula (1) according to claim 1 in a single-step, one-bath process, and dyeing from an aqueous liquor in the temperature range from 100° to 150° C. and in the pH range from 4 to 7.5.

* * * * *